United States Patent
Ichikawa

(10) Patent No.: US 8,742,629 B2
(45) Date of Patent: Jun. 3, 2014

(54) RESIDENTIAL ELECTRIC POWER STORAGE SYSTEM

(75) Inventor: Shinji Ichikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 114 days.

(21) Appl. No.: 13/514,206

(22) PCT Filed: Dec. 28, 2009

(86) PCT No.: PCT/JP2009/071741
§ 371 (c)(1),
(2), (4) Date: Jun. 6, 2012

(87) PCT Pub. No.: WO2011/080813
PCT Pub. Date: Jul. 7, 2011

(65) Prior Publication Data
US 2012/0261986 A1    Oct. 18, 2012

(51) Int. Cl.
*H02J 7/35*    (2006.01)
(52) U.S. Cl.
USPC .............................. 307/130; 307/24; 307/131
(58) Field of Classification Search
CPC ............ H02J 7/34; H02J 7/35; B60L 11/1811
USPC ........................................... 307/24, 130, 131
See application file for complete search history.

(56) References Cited

FOREIGN PATENT DOCUMENTS

| JP | A-5-292672 | 11/1993 |
|----|----|----|
| JP | A-5-292674 | 11/1993 |
| JP | A-6-133472 | 5/1994 |
| JP | A-8-331776 | 12/1996 |
| JP | A-11-46458 | 2/1999 |
| JP | A-11-136866 | 5/1999 |
| JP | A-11-178237 | 7/1999 |
| JP | A-2001-8380 | 1/2001 |
| JP | A-2002-17044 | 1/2002 |
| JP | A-2004-180467 | 6/2004 |
| JP | A-2007-312597 | 11/2007 |
| JP | A-2008-154334 | 7/2008 |
| JP | A-2009-278776 | 11/2009 |

OTHER PUBLICATIONS

International Search Report issued in International Patent Application No. PCT/JP2009/071741 dated Mar. 9, 2010.

*Primary Examiner* — Hal Kaplan
(74) *Attorney, Agent, or Firm* — Oliff PLC

(57) ABSTRACT

A residential electric power storage system includes a lead-in wire, a distribution line, an electric power storage device, a voltage sensor sensing a voltage of the lead-in wire, a current sensor sensing a current charged to the electric power storage device through the distribution line and an electric power adjustment unit adjusting electric power charged to the electric power storage device through the distribution line; and a controller controlling the electric power adjustment unit. If the lead-in wire has voltage smaller than a threshold voltage, the controller controls the electric power adjustment unit to match the current that is charged to the electric power storage device to a command value to provide current control, whereas if the lead-in wire has voltage larger than the threshold voltage, the controller controls the electric power adjustment unit to match the voltage of the lead-in wire to a command value to provide voltage control.

4 Claims, 3 Drawing Sheets

RESIDENTIAL ELECTRIC POWER STORAGE SYSTEM

TECHNICAL FIELD

The present invention relates to a residential electric power storage system, and particularly to controlling an amount of electric power discharged from an electric power storage device.

BACKGROUND ART

While there is a smaller demand for electric power late at night than daytime, it is better to operate an electric power generator continuously, because doing so is more efficient. It is difficult to store generated electric power, and accordingly, electric power generation facilities have their capabilities set to generate electric power in accordance with a peak of demand for electric power. Under such a circumstance, it is well known that late-night power rate is lower than daytime power rate. It is desirable if households, companies, factories, and other electric power consumers can store midnight electric power in a reservoir type storage battery and use it in the daytime to achieve a reduced electricity bill and a leveled load.

Japanese Patent Laying-Open No. 2001-008380 (PTL 1) discloses a system allowing an electric vehicle and a residence to mutually transmit electric power and indicates leveling a demand for electric power.

CITATION LIST

Patent Literature

PTL 1: Japanese Patent Laying-Open No. 2001-008380
PTL 2: Japanese Patent Laying-Open No. 2007-312597
PTL 3: Japanese Patent Laying-Open No. 11-178237
PTL 4: Japanese Patent Laying-Open No. 5-292672
PTL 5: Japanese Patent Laying-Open No. 5-292674
PTL 6: Japanese Patent Laying-Open No. 8-331776
PTL 7: Japanese Patent Laying-Open No. 11-046458
PTL 8: Japanese Patent Laying-Open No. 11-136866

SUMMARY OF INVENTION

Technical Problem

In recent years, electric vehicles, hybrid vehicles, system interconnection type solar photovoltaic power generation systems and the like are widespread and accordingly, electric power storage devices such as various types of batteries are also increasingly reduced in cost, and households and other consumers of small capacity are now entering a stage to practically introduce an electric power storage device for leveled electric power.

However, it is still hard to say that electric power storage devices are inexpensive. Residential electric power storage system is used over a long period of time of 10 years or longer. Accordingly, however lower a late-night power rate may be than a daytime power rate, an electric power storage device having a short lifetime and hence being costly for replacement would cancel the economic advantage of the night power rate.

An electric power storage device varies in lifetime depending on how it is used.

FIG. 5 shows a relationship between a discharging current and an expected number of lifetime cycles.

With reference to FIG. 5, the axis of ordinate represents the expected number of lifetime cycles (in times), and the axis of abscissa represents a current (CA) discharged from an electric power storage device. CA is a value calculated by a charging current (A)/a battery's capacity (Ah), and for CA=1 it is a discharging current that would discharge the battery's entire capacity in 1 hour. As represented in FIG. 5, it can be seen that as the discharging current increases, the expected number of lifetime cycles decreases gradually. Accordingly, when the discharging current is increased indefinitely the electric power storage device's lifetime would be shortened. Japanese Patent Laying-Open No. 2001-008380 does not discuss an electric power storage device's lifetime.

Furthermore, allowing a system interconnection type solar photovoltaic power generation system and such an electric power storage device to coexist has not been sufficiently discussed. Accordingly, there still is a room for consideration left for what should be done to raise an overall operation rate to obtain benefit in terms of cost.

An object of the present invention is to provide a residential electric power storage system charging and discharging an electric power storage device by a control method suitable for a condition of the electric power of a residence having the system installed therein with making consideration of the lifetime of the electric power storage device.

Solution to Problem

The present invention in summary provides a residential electric power storage system, including: an electric power generation device connected to a lead-in wire extending from a commercial power supply system; a distribution line connected to the lead-in wire for supplying an electrical load of a residence with electric power; an electric power storage device configured to be capable of supplying the electrical load with electric power; a voltage sensor sensing a voltage of the lead-in wire; a current sensor sensing a current charged to the electric power storage device through the distribution line; an electric power adjustment unit provided between the electric power storage device and the distribution line and adjusting electric power charged to the electric power storage device through the distribution line; and a controller controlling the electric power adjustment unit. If the lead-in wire has voltage smaller than a threshold voltage, the controller performs a current control that controls the electric power adjustment unit to match the current that is charged to the electric power storage device to a command value, whereas if the lead-in wire has voltage larger than the threshold voltage, the controller performs a voltage control that controls the electric power adjustment unit to match the voltage of the lead-in wire to a command value.

Preferably, the distribution line is configured to be capable of supplying a charging electric power to a battery mounted in an automobile, and if the lead-in wire has voltage larger than a threshold value, and when the current sensor senses a current larger than a threshold current and the battery also has an electrically chargeable state, the controller performs the voltage control to electrically charge the electric power storage device and also electrically charge the battery.

Preferably, the controller performs the voltage control to prevent the lead-in wire from reaching a stopping voltage where the electric power generation device compulsorily stops from generating electric power.

Advantageous Effects of Invention

The present residential electric power storage system thus allows a control method suitable for a condition of the electric power of a residence having the system installed therein, to be employed to electrically charge and discharge an electric power storage device, and can thus provide the electric power storage device with long lifetime.

DESCRIPTION OF EMBODIMENTS

Hereinafter reference will be made to the drawings to describe the present invention in embodiments. In the figures, identical or corresponding components are identically denoted, and will thus not be described repeatedly.

Figure 1:
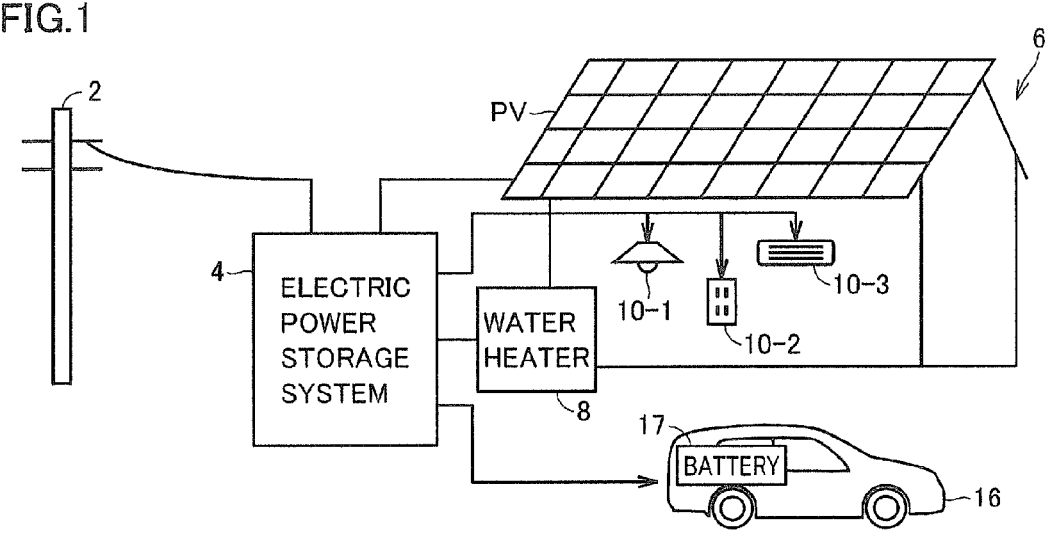
FIG. 1 is a diagram for outlining a residential electric power storage system.

FIG. 1 is a diagram for outlining a residential electric power storage system.

With reference to FIG. 1, an electric power storage system 4 is installed in a residence 6. Electric power storage system 4 has connected thereto a commercial power supply system 2, a solar battery PV, a household electrical load 10 (including illumination 10-1, a plug outlet 10-2, an air conditioner 10-3, and the like), an electric water heater 8, and an automobile 16. Automobile 16 is a plug-in hybrid vehicle having an externally electrically chargeable battery 17 mounted therein. Note that automobile 16 may be an electric vehicle or a fuel cell powered vehicle, for example.

Figure 2:
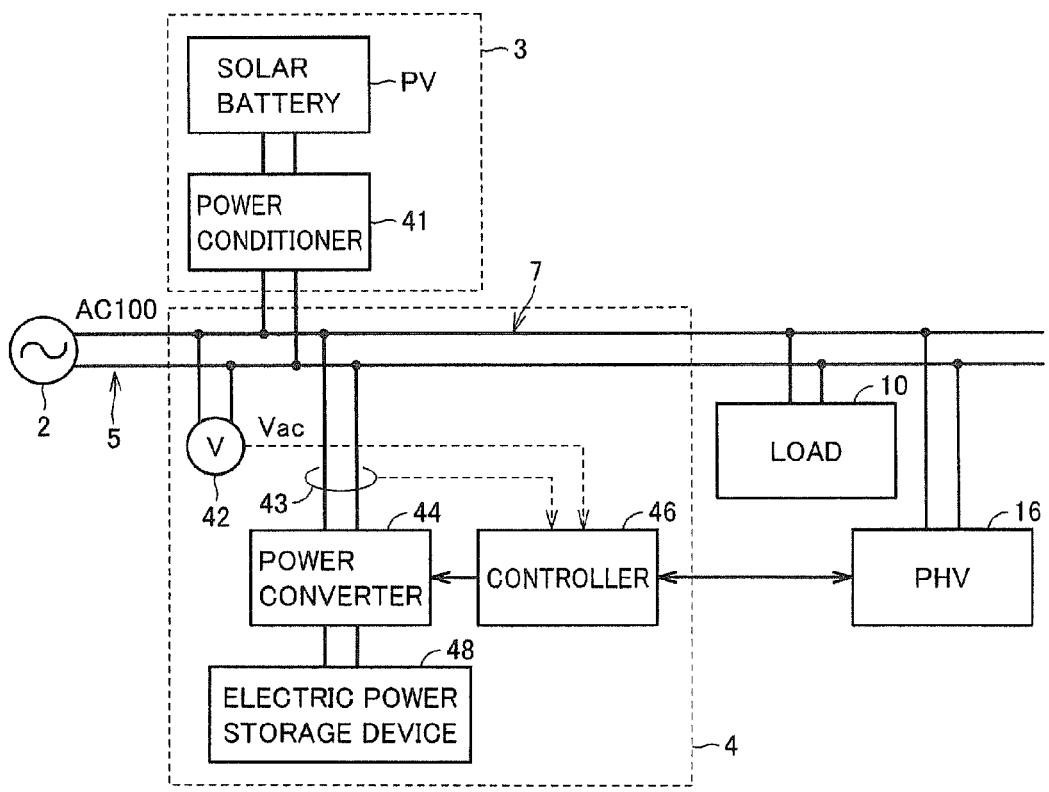
FIG. 2 is a block diagram for illustrating a configuration of an electric power storage system 4.

FIG. 2 is a block diagram for illustrating a configuration of electric power storage system 4.

Referring to FIG. 1 and FIG. 2, residential electric power storage system 4 includes a lead-in wire 5 extending from commercial power supply system 2 connected to an electric power generation device 3, a distribution line 7 connected to lead-in wire 5 for supplying electric power to electrical load 10 of residence 6, an electric power storage device 48 configured to be capable of supplying electrical load 10 with electric power, a voltage sensor 42 sensing the voltage of lead-in wire 5, a current sensor 43 sensing a current charged to electric power storage device 48 through distribution line 7, a power converter 44 provided between electric power storage device 48 and distribution line 7 and adjusting the electric power charged to electric power storage device 48 through distribution line 7, and a controller 46 which controls power converter 44. If lead-in wire 5 has voltage smaller than a threshold voltage, controller 46 performs current control that controls power converter 44 to match a current that is charged to electric power storage device 48 to a command value, whereas if lead-in wire 5 has voltage larger than the threshold voltage, controller 46 performs voltage control that controls power converter 44 to match the voltage of lead-in wire 5 to a command value. Note that the threshold value applied in switching the voltage control to the current control and the threshold value applied in switching the current control to the voltage control may be different values.

Electric power generation device 3 includes solar battery PV and a power conditioner 41. Power conditioner 41 is provided indoors aside from a solar photovoltaic power generation panel installed on a roof having solar battery PV mounted thereon. Power conditioner 41 is employed for a typical solar photovoltaic power generation system, and converts direct current electric power that is extracted from the solar battery into alternating current electric power. Note that electric power storage system 4 may be configured to further include power conditioner 41.

Preferably, distribution line 7 is configured to be capable of supplying a charging electric power to battery 17 mounted in automobile 16. More specifically, distribution line 7 is provided with an electric socket or the like used to connect a charging cable. Alternatively, power converter 44 connected to distribution line 7 is provided with an electric socket or the like used to connect a charging cable. If lead-in wire 5 has voltage larger than the threshold value, and when current sensor 43 senses a current larger than a threshold current and automobile 16 also has battery 17 in an electrically chargeable state (i.e., when it has an SOC with a margin relative to an upper limit value for management), controller 46 performs the voltage control to electrically charge electric power storage device 48 and also electrically charge battery 17 of automobile 16. In that case, automobile 16 operates in response to an instruction received from controller 46 to perform electrical charging and cooperates with power converter 44 and electric power storage device 48 to serve to hold the voltage on distribution line 7 and lead-in wire 5 at a prescribed voltage.

Note that preferably, power converter 44 may be configured to be capable of supplying electric power storage device 48 and together therewith battery 17 mounted in automobile 16 with charging electric power. If such a configuration is assumed, and if lead-in wire 5 has voltage larger than the threshold value and when current sensor 43 senses a current larger than the threshold current and automobile 16 also has battery 17 in an electrically chargeable state, controller 46 also controls power converter 44 to perform the voltage control to electrically charge electric power storage device 48 and also electrically charge battery 17 of automobile 16.

To prevent lead-in wire 5 from having voltage higher than a specified voltage, power conditioner 41 normally has a function to compulsorily stop electric power generation even when a large amount of solar radiation is provided.

Preferably, controller 46 performs the voltage control to prevent lead-in wire 5 from reaching a stopping voltage where electric power generation device 3 compulsorily stops from generating electric power. Power conditioner 41 thus less frequently, compulsorily stops electric power generation. This allows the electric power generated by electric power generation device 3 of the residence to be more frequently flown into the commercial power supply system, and more electric power to be sold to an electric power company.

Controller 46 obtains data of an amount of electric power consumed in residence 6, accumulates the obtained data, uses the accumulated data to create a pattern representatively indicating how electric power storage device 48 varies in state of charge for its discharging period, and determines a limit value for a discharging current I to correspond to the pattern.

Controller 46 creates a plurality of patterns and determines a plurality of limit values corresponding to the plurality of patterns, respectively. Controller 46 selects any of the patterns based on selection information, e.g., dates, the days of the week, seasons, and the like, and obtains a limit value that corresponds to the selected pattern, and therefrom determines a limit value for a current discharged from electric power storage device 48 in the discharging period. The discharging period is for example from 9:00 a.m. to 17:00 p.m.

Electric power storage device 48 is configured to be capable of receiving electric power of AC 100V or 200V (the voltage may vary from country to country) from commercial power supply system 2 and storing the received electric power therein. Electric power storage device 48 has a charging period for which a lower power rate is set than that for the discharging period. The charging period can be a late-night power rate time zone determined by the electric power company of interest, for example.

Figure 3:
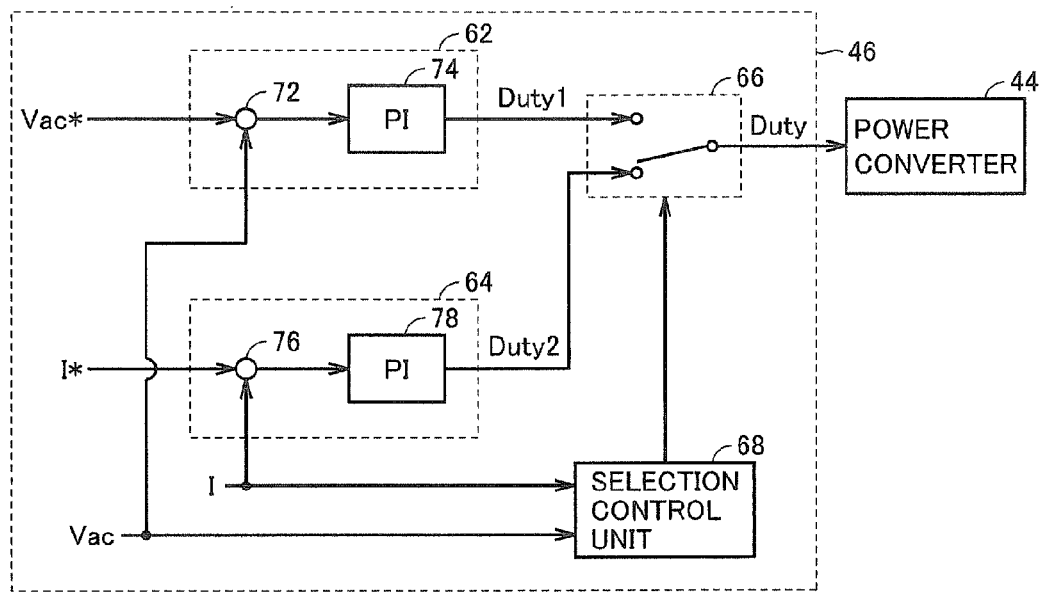
FIG. 3 is a functional block diagram representing a controller 46 shown in FIG. 2 in detail.

FIG. 3 is a functional block diagram representing controller 46 shown in FIG. 2 in detail. Note that controller 46 can be implemented by software or hardware.

Referring to FIG. 2 and FIG. 3, controller 46 includes a voltage control block 62 which performs the voltage control based on a target voltage value Vac* and a value Vac sensed by voltage sensor 42, a current control block 64 which performs the current control based on a target current value I* and a value I sensed by current sensor 43, a selection control unit 68 which selects performing the current control or the voltage control based on sensed value Vac and sensed value I, and a selection switching unit 66 which selects one of a duty command value Duty1 output from voltage control block 62 and a duty command value Duty2 output from current control block 64 and outputs the selected duty command value to power converter 44 as a duty command value Duty.

Voltage control block 62 includes a subtraction unit 72 which calculates a difference between target value Vac* and sensed value Vac, and a PI control unit 74 which subjects the difference value that subtraction unit 72 outputs to proportional plus integral control.

Current control block 64 includes a subtraction unit 76 which calculates a difference between target value I* and sensed value I, and a PI control unit 78 which subjects the difference value that subtraction unit 76 outputs to proportional plus integral control.

Controller 46 thus described in FIG. 3 can also be implemented through software using a computer. The computer may be of a typical configuration, and it is configured for example including a CPU, an A/D converter, a ROM, a RAM, an interface unit, and the like.

The interface unit for example communicates with other ECUs, inputs data to be rewritten when an electrically rewritable flash memory or the like is used as a ROM, reads a data signal from a memory card, a CD-ROM and/or a computer readable storage medium, and the like.

Note that controller 46 is not limited to such a configuration and may be implemented including a plurality of CPUs.

Figure 4:
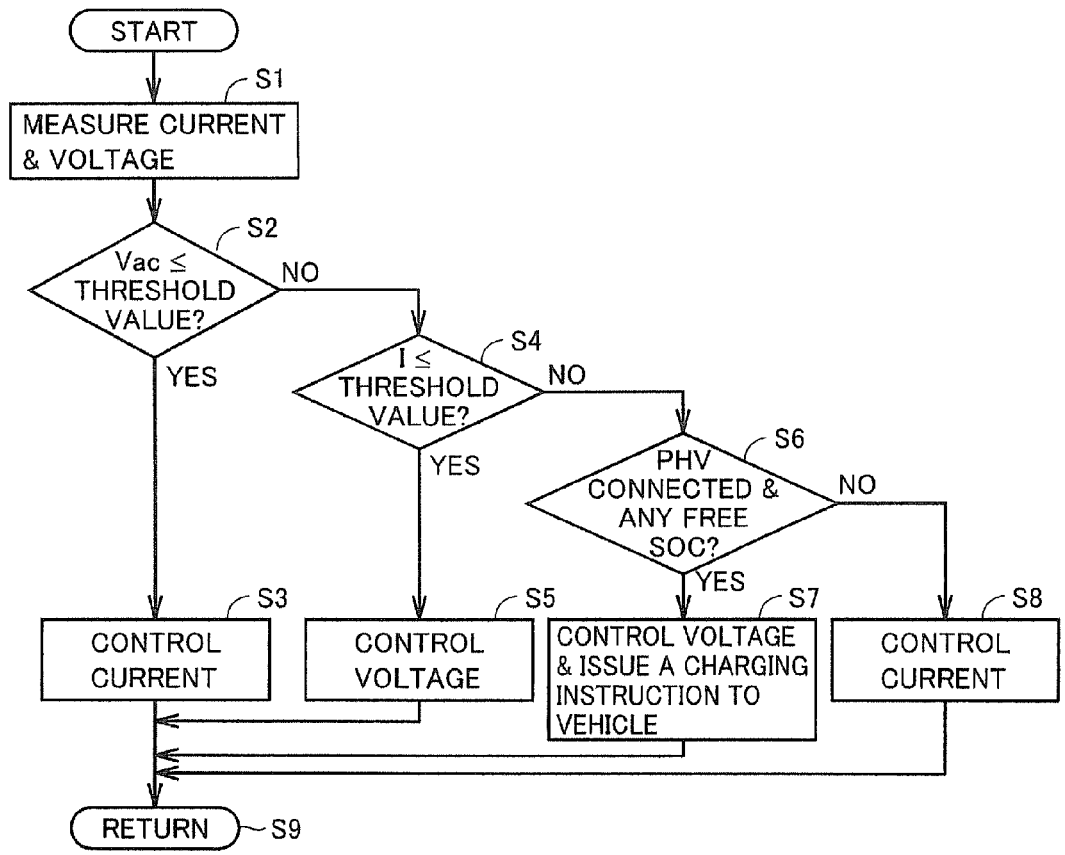
FIG. 4 is a flowchart representing a structure to control a process performed by controller 46.
Figure 5:
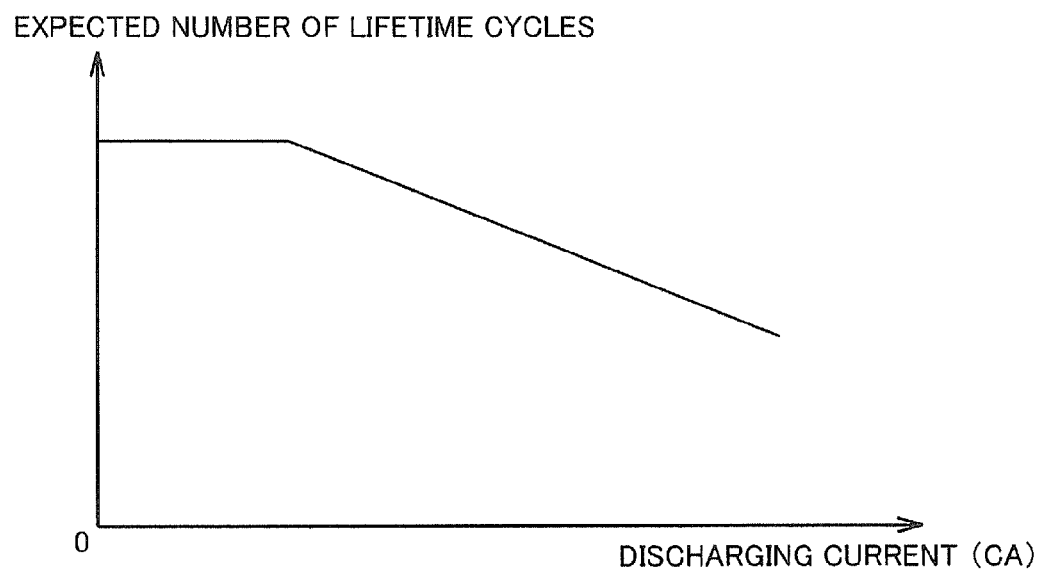
FIG. 5 shows a relationship between a discharging current and an expected number of lifetime cycles.

FIG. 4 is a flowchart representing a structure to control a process performed by controller 46. The process of this flowchart is called from a predetermined main routine and performed whenever a fixed period of time elapses or a predetermined condition is established.

With reference to FIG. 2 and FIG. 4, initially at Step S1, current sensor 43 and voltage sensor 42 measure a current and a voltage, respectively. At Step S2, whether the sensed voltage has value Vac equal to or smaller than a predetermined threshold value is determined. This threshold value is set depending on a range in which the electric power company concerned should hold voltage.

For example in Japan, for a standard voltage of 100V, electric power companies manage to supply voltage within a range of 101V±6V. In such a case, if sensed value Vac is for example 107V, and the electric power generated by solar battery PV is reversely flown to commercial power supply system 2, a voltage exceeding 107V may be supplied. In such a case, even if a large amount of solar radiation is provided, power conditioner 41 stops solar battery PV from generating electric power.

Accordingly, if sensed value Vac does not exceed the threshold value at Step S2, Step S3 is performed to perform the current control to cause electric power storage device 48 to discharge a current based on a regular plan. This plan provides a discharging current determined to completely use within a discharging time zone the electric power that has been stored in electric power storage device 48 during the nighttime. This allows an appropriately controlled discharge rate, and the electric power storage device can thus have an increased lifetime.

In contrast, if sensed value Vac exceeds the threshold value at Step S2, discharging a current from electric power storage device 48 as based on the regular plan may push up the supplied voltage to a rated value or larger, and to prevent this, solar battery PV may be stopped from generating electric power. This prevents solar battery PV from being exploited, and accordingly, a control is exerted in electric power storage system 4 to prevent the supplied voltage from rising. Accordingly, the control proceeds from Step S2 to Step S4.

At Step S4, whether current sensor 43 senses value I equal to or smaller than the threshold value is determined. Herein, sensed value I equal to or smaller than the threshold value indicates that electric power storage device 48 can further be electrically charged and lead-in wire 5 can thus be prevented from having increased voltage. Accordingly, when sensed value I is equal to or smaller than the threshold value, the control proceeds to Step S5 to perform the voltage control. In the voltage control, power converter 44 is controlled so that sensed value Vac matches target voltage Vac*. Such control allows surplus electric power generated by solar battery PV to be charged to electric power storage device 48.

In contrast, if at Step S4 sensed value I is not equal to or smaller than the threshold value, the control proceeds to Step S6. At Step S6, it is determined whether plug-in hybrid vehicle 16 has a charging cable connected to distribution line 7 (or power converter 44) and it is determined through communication with automobile 16 whether battery 17 has a state of charge (SOC) indicating that battery 17 has a free capacity.

If at Step S6 automobile 16 has the charging cable connected and battery 17 also has a free capacity, the control proceeds to Step S7. At Step S7 controller 46 performs the voltage control to control power converter 44, and also issues a charging instruction to the automobile. Such control can cause electrically charging the automobile's battery to prevent lead-in wire 5 from having increased voltage and thus provides an increased possibility that solar battery PV is allowed to generate electric power.

In contrast, at Step S6 if the automobile does not have the charging cable connected or if the automobile has the charging cable connected and the automobile's battery has no free capacity, the control proceeds to Step S8. At Step S8, the current control is performed and electric power storage device 48 is electrically charged as originally planned. At the time, lead-in wire 5 may have voltage approaching an upper limit value, and power conditioner 41 may restrict an amount of electric power generated by solar battery PV.

When a control system is determined at Step S3, S5, S7, or S8, the control proceeds to Step S9 and returns to the main routine.

As has been described above, in the present embodiment, the voltage on an output end (or lead-in wire 5) of solar photovoltaic power generation and the current on an output end of power converter 44 are measured and the voltage control and the current control are switched based on a voltage condition and a current condition. Basically, electric discharging is performed while the current control suppresses a discharge rate, and electric power storage device 48 can thus be provided with long lifetime. The discharge rate is set to allow the electric power that electric power storage device 48 has stored at night to be completely used, and energy efficiency is also improved. Furthermore, when lead-in wire 5 has increased voltage as the solar photovoltaic power generation is performed, and accordingly, the solar photovoltaic power generation is likely to be restricted by power conditioner 41, electric power storage device 48 or the automobile's battery 17 is charged with surplus electric power to maximize a benefit in terms of cost.

It should be understood that the embodiments disclosed herein are illustrative and non-restrictive in any respect. The scope of the present invention is defined by the terms of the claims, rather than the description above, and is intended to include any modifications within the scope and meaning equivalent to the terms of the claims.

REFERENCE SIGNS LIST

2: commercial power supply system, 3: electric power generation device, 4: residential electric power storage system, 5: lead-in wire, 6: residence, 7: distribution line, 8: electric water heater, 10: electrical load, 10-1: illumination, 10-2: electric socket, 10-3: air conditioner, 16: plug-in hybrid vehicle, 17: battery, 41: power conditioner, 42: voltage sensor, 43: current sensor, 44: power converter, 46: controller, 48: electric power storage device, 62: voltage control block, 64: current control block, 66: selection switching unit, 68: selection control unit, 72, 76: subtraction unit, 74, 78: PI control unit.

The invention claimed is:

1. A residential electric power storage system, comprising:
   a lead-in wire extending from a commercial power supply system connected to an electric power generation device;
   a distribution line connected to said lead-in wire for supplying an electrical load of a residence with electric power;
   an electric power storage device configured to be capable of supplying said electrical load with electric power;
   a voltage sensor sensing a voltage of said lead-in wire;
   a current sensor sensing a current charged to said electric power storage device through said distribution line;
   an electric power adjustment unit provided between said electric power storage device and said distribution line and adjusting electric power charged to said electric power storage device through said distribution line; and
   a controller controlling said electric power adjustment unit,
   if said lead-in wire has voltage smaller than a threshold voltage, said controller performing current control controlling said electric power adjustment unit to match the current that is charged to said electric power storage device to a command value, whereas if said lead-in wire has voltage larger than said threshold voltage, said controller performing voltage control controlling said electric power adjustment unit to match the voltage of said lead-in wire to a command value.

2. The residential electric power storage system according to claim 1, wherein:
   said distribution line is configured to be capable of supplying a charging electric power to a battery mounted in an automobile; and
   if said lead-in wire has voltage larger than a threshold value, and when said current sensor senses a current larger than a threshold current and said battery also has an electrically chargeable state, said controller performs said voltage control to electrically charge said electric power storage device and also electrically charge said battery.

3. The residential electric power storage system according to claim 2, wherein said controller performs said voltage control to prevent said lead-in wire from reaching a stopping voltage where said electric power generation device compulsorily stops from generating electric power.

4. The residential electric power storage system according to claim 1, wherein said controller performs said voltage control to prevent said lead-in wire from reaching a stopping voltage where said electric power generation device compulsorily stops from generating electric power.

* * * * *